M. L. DAVIS.
OVEN FOR BAKING PRETZELS.
APPLICATION FILED SEPT. 19, 1911.

1,036,580.

Patented Aug. 27, 1912.

2 SHEETS—SHEET 1.

WITNESSES
B. P. Faltin
M. L. Lefevre

INVENTOR
Miles L. Davis,
BY
John J. Thompson
ATTORNEY

M. L. DAVIS.
OVEN FOR BAKING PRETZELS.
APPLICATION FILED SEPT. 19, 1911.

1,036,580.

Patented Aug. 27, 1912.
2 SHEETS—SHEET 2.

WITNESSES
B. P. Fallin
M. L. Lefevre

INVENTOR
Miles L. Davis,
BY
John J. Thompson
ATTORNEY

UNITED STATES PATENT OFFICE.

MILES L. DAVIS, OF LANCASTER, PENNSYLVANIA.

OVEN FOR BAKING PRETZELS.

1,036,580.

Specification of Letters Patent.

Patented Aug. 27, 1912.

Application filed September 19, 1911. Serial No. 650,109.

*To all whom it may concern:*

Be it known that I, MILES L. DAVIS, a citizen of the United States, residing at Lancaster, in the county of Lancaster and State of Pennsylvania, have invented certain new and useful Improvements in Ovens for Baking Pretzels, of which the following is a specification, reference being had therein to the accompanying drawing.

This invention relates to a baking oven of that class employed in the baking of pretzels where it is important to maintain an even heat and also to regulate the time that the pretzel is in the oven, and the invention relates more particularly to an oven having a movable hearth or feed apron, and its novel construction.

The object of the invention is to provide a device of this kind that shall be cheap, durable and efficient; containing few parts and easily renewed. Another object being to provide a baking oven that shall be readily regulated and capable of maintaining an even temperature. Still another object being to provide means whereby the period of time required for the proper baking can be regulated and maintained. And a still further object of the invention is to provide an endless hearth or baking surface, so constructed of brick or suitable vitrified material that the same may be readily renewed, and that will also prevent the pretzels from sticking thereto and burning.

With these and other objects in view, my invention consists in certain construction and combination of parts as will hereinafter be fully described and claimed in the annexed specification and illustrated in the accompanying drawings which form a part of this application and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

Figure 1:
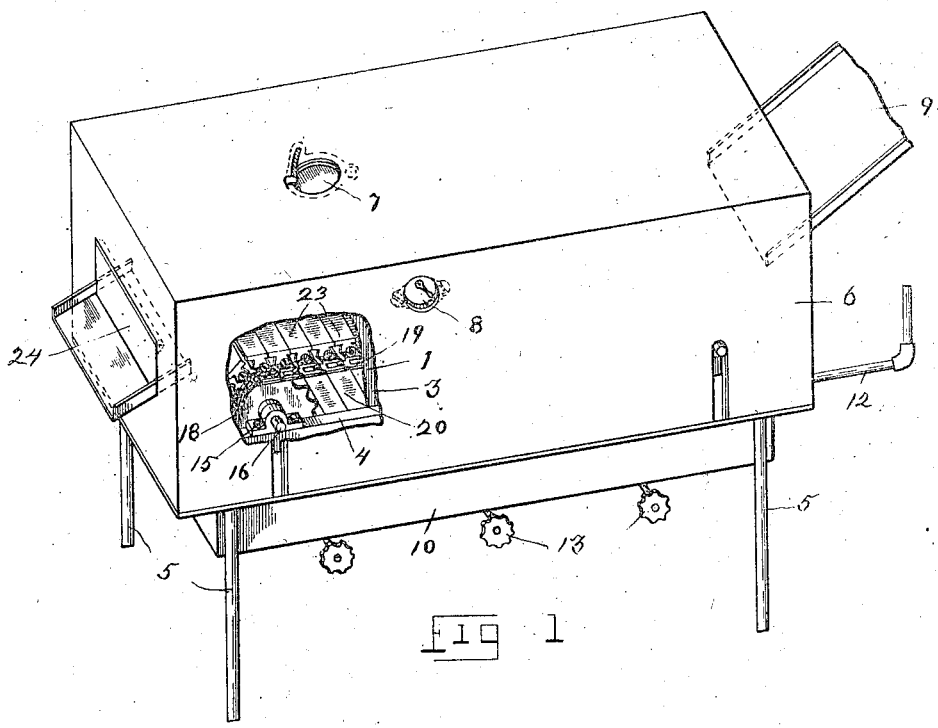
Figure 2:
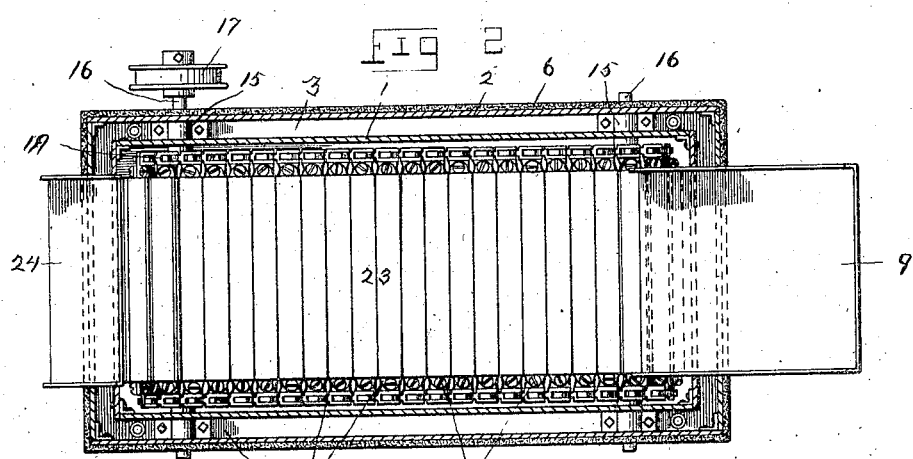
Figure 3:
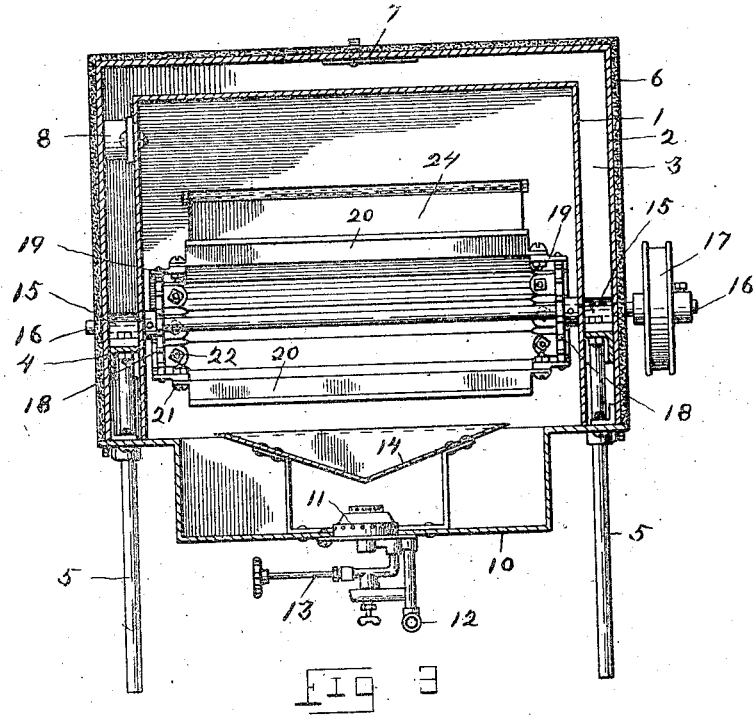
Figure 4:
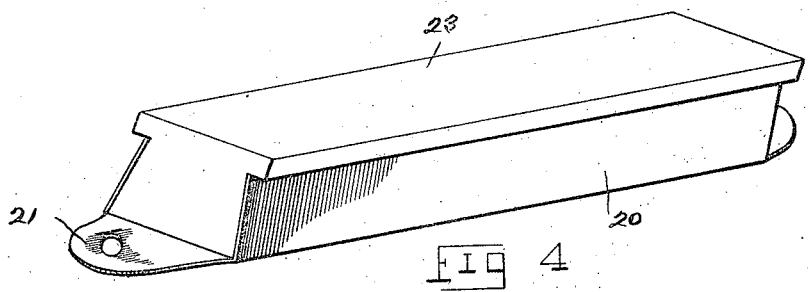

In the drawings:—Figure 1, is a perspective view of an oven embodying my invention, and showing the side partly cut away to expose the inner parts. Fig. 2, is a longitudinal sectional view of the oven taken on a line above the hearth. Fig. 3, is a vertical cross sectional view. Fig. 4, is a detail view in perspective of one of the hearth bricks and holders or retainers.

Referring to the drawings, the oven may be of any desired shape and suitable construction, but is here shown as comprising the inner and outer shells 1, and 2, respectively, which are spaced apart forming an air chamber 3, and containing near the lower end thereof, the frame 4, to which the supporting legs 5, are secured; while the outer shell 2, is covered with asbestos 6, and is also provided in the top with the damper 7, and in the side with the thermometer 8, for indicating the temperature of the oven. Said oven is also provided upon one end with a feed opening 9, admitting a conveyer for feeding the unbaked pretzels to the hearth, and upon the opposite end with a delivery opening through which the baked pretzels are delivered. The under part of said oven is closed by a pan 10, within which is mounted a series of burners 11, supplied by a feed pipe 12, and controlled by the valves 13, in the usual way; while within said pan 10, is mounted a heat distributing diaphragm 14, to maintain an even distribution of the heat.

Secured to the frame 4, near the ends thereof, are bearing boxes 15, within which are rotatably mounted the transverse shafts 16; one of said shafts 16, being extended beyond the side of the oven and provided with a driving pulley 17, or hand-crank, for operating the traveling hearth. Upon said shafts 16, and within the oven and near the side walls thereof, are secured the sprocket wheels 18, around which are placed the endless sprocket chains 19, which form the sides of the traveling hearth.

The hearth is formed by a series of trough-shaped retainers 20, formed with attaching ears 21, on their ends for securing them to the links of the chain 19, by the screws 22; while their sides slant inwardly forming a trough of less width at the top than at the bottom and open on the ends; and it will thus be seen that any one of said retainers 20, can be removed without disturbing the remaining ones or disconnecting the chain 19. Within said retainers 20, is placed a brick of clay, soapstone or other suitable material by sliding the same in from one end as its sides are dove-tailed to conform to the sides of the retainers 20, while said brick is T-shaped in cross section making a continuous hearth surface, and also there is a space between the sides of the adjacent retainers 20.

It will thus be seen that as the unbaked pretzels are delivered upon one end of the traveling hearth at the charging end of the oven, they are carried thereon through the oven, the time consumed during said travel being sufficient to properly bake the pretzels having been based on the temperature of the oven, and the pretzels are delivered from the other end of the oven; the hearth affording a surface free from metal which would become too hot and burn the pretzels, and also as the adjacent bricks part from each other as the chain goes over the sprockets, as illustrated in Fig. 1, any pretzels that have become stuck to the hearth surface are thus loosened, and as the sides of the adjacent retainers are spread from each other, any parts of pretzels that drop between them do not clog or affect the working of the machine.

Having thus described my invention what I claim as new and desire to secure by Letters Patent is:—

1. In an oven of the class described, a traveling hearth situated above the fire-box, said traveling hearth composed of a series of retainers U-shaped in cross section, and a series of bricks detachably secured in said retainers.

2. In an oven of the class described, the combination with a baking-chamber and a fire-box, having a traveling endless hearth mounted in said baking-chamber above said fire-box, and means for operating said traveling endless hearth situated without said oven, said hearth comprising a series of transverse retainers U-shaped in cross section, and bricks held within said retainers.

3. In an oven of the class described, the combination with a baking-chamber and a fire-box, having an endless traveling hearth mounted in said baking-chamber, said hearth comprising a series of retainers U-shaped in cross-section with their sides converging and open on the ends, and bricks T-shaped in cross-section and adapted to be held within said retainers by friction.

4. A baking oven of the class described, comprising an inner and an outer shell forming a baking-chamber, a heater secured in the lower part of said chamber, transverse shafts rotatably mounted in said baking-chamber near the ends thereof and above said heater, sprockets secured upon said shafts within said baking-chamber, endless conveyer chains mounted on said sprockets, a series of U-shaped retainers having their ends detachably secured to said conveyer, and bricks secured within said retainers with their upper surfaces projecting above the sides of said retainers to form a hearth.

In testimony whereof I affix my signature in presence of two witnesses.

MILES L. DAVIS.

Witnesses:
 JOHN J. THOMPSON,
 WM. J. COULTER.